(12) United States Patent
Peng et al.

(10) Patent No.: US 11,312,077 B2
(45) Date of Patent: Apr. 26, 2022

(54) 3D PRINTING APPARATUS, PRODUCTION LINE USING THE APPARATUS, AND CYCLICAL PRINTING METHOD THEREOF

(71) Applicant: NATIONAL INTELLIGENT FOUNDRY INDUSTRY INNOVATION CENTER, Ningxia (CN)

(72) Inventors: Fan Peng, Ningxia (CN); Yi Liu, Ningxia (CN); Zhijun Zhou, Ningxia (CN); Nanhua Meng, Ningxia (CN); Zhengjie Li, Ningxia (CN)

(73) Assignee: KOCEL INTELLIGENT MACHINERY LIMITED, Ningxia (CN)

( * ) Notice: Subject to any disclaimer, the term of this patent is extended or adjusted under 35 U.S.C. 154(b) by 251 days.

(21) Appl. No.: 16/487,416

(22) PCT Filed: May 24, 2019

(86) PCT No.: PCT/CN2019/088412
§ 371 (c)(1),
(2) Date: Aug. 20, 2019

(87) PCT Pub. No.: WO2019/228281
PCT Pub. Date: Dec. 5, 2019

(65) Prior Publication Data
US 2021/0187854 A1  Jun. 24, 2021

(30) Foreign Application Priority Data

May 28, 2018 (CN) .......................... 201810520974.0
May 28, 2018 (CN) .......................... 201820799671.2

(51) Int. Cl.
*B29C 64/35* (2017.01)
*B29C 64/255* (2017.01)
(Continued)

(52) U.S. Cl.
CPC ............ *B29C 64/35* (2017.08); *B29C 64/165* (2017.08); *B29C 64/209* (2017.08);
(Continued)

(58) Field of Classification Search
CPC ..... B29C 64/35; B29C 64/259; B29C 64/176; B29C 64/182; B29C 64/165; B29C 64/25; B29C 64/255; B22F 12/80–86
See application file for complete search history.

(56) References Cited

U.S. PATENT DOCUMENTS

| 5,204,055 A | 4/1993 | Sachs et al. |
| 6,824,714 B1 * | 11/2004 | Turck ..................... B33Y 30/00 264/40.1 |

(Continued)

FOREIGN PATENT DOCUMENTS

| CA | 2958733 A1 | 3/2016 |
| CN | 203887993 U | 10/2014 |

(Continued)

OTHER PUBLICATIONS

Translation of CN 105710294.*
(Continued)

*Primary Examiner* — Mary Lynn F Theisen
(74) *Attorney, Agent, or Firm* — ArentFox Schiff LLP

(57) ABSTRACT

The embodiments of the present disclosure provide a 3D printing apparatus, a production line using the apparatus, and a cyclical printing method thereof. The 3D printing apparatus includes a frame assembly, and a powder spreading unit, a powder spreading movement system, a powder supply device, an inkjet unit, an inkjet movement system, a working box, a transfer unit, an inner lifting mechanism, an outer lifting mechanism, an accessory unit and an auxiliary unit that are mounted on the frame assembly. In the embodiments of the present disclosure, a plurality of 3D printing (Continued)

apparatuses are arranged in a centralized manner to form a production line system with high printing efficiency, wherein the plurality of 3D printing apparatuses and baking devices are planned and arranged in a centralized manner, and form a closed-loop production system by means of a plurality of conveying and transferring routes, which reduces the idle time of some of the apparatuses during production and improves the use efficiency of the apparatuses, thereby realizing 3D printing of high efficiency.

19 Claims, 5 Drawing Sheets

(51) Int. Cl.
    *B29C 64/25*     (2017.01)
    *B33Y 30/00*     (2015.01)
    *B29C 64/165*     (2017.01)
    *B29C 64/321*     (2017.01)
    *B29C 64/209*     (2017.01)
    *B29C 64/236*     (2017.01)
    *B33Y 10/00*     (2015.01)
    *B33Y 40/20*     (2020.01)

(52) U.S. Cl.
    CPC ............ *B29C 64/236* (2017.08); *B29C 64/25* (2017.08); *B29C 64/255* (2017.08); *B29C 64/321* (2017.08); *B33Y 10/00* (2014.12); *B33Y 30/00* (2014.12); *B33Y 40/20* (2020.01)

(56) References Cited

U.S. PATENT DOCUMENTS

| | | | |
|---|---|---|---|
| 2008/0241404 A1* | 10/2008 | Allaman | B29C 64/165 |
| | | | 427/333 |
| 2013/0004607 A1 | 1/2013 | Hoechsmann et al. | |
| 2013/0220572 A1 | 8/2013 | Rocco et al. | |
| 2017/0246808 A1 | 8/2017 | Hochsmann et al. | |
| 2018/0133798 A1* | 5/2018 | Stammberger | B29C 64/35 |
| 2018/0133963 A1* | 5/2018 | Bechmann | B22F 10/20 |
| 2018/0169894 A1* | 6/2018 | Hochsmann | B28B 1/001 |
| 2018/0297278 A1* | 10/2018 | Fulop | B33Y 40/00 |
| 2018/0297284 A1* | 10/2018 | Fulop | B29C 64/165 |
| 2019/0176402 A1* | 6/2019 | Hofmann | B22F 10/20 |
| 2019/0299521 A1* | 10/2019 | Kremer | B22F 10/20 |
| 2019/0299532 A1* | 10/2019 | Kremer | B29C 64/379 |
| 2020/0038960 A1* | 2/2020 | Laib | B23B 1/00 |
| 2021/0016501 A1* | 1/2021 | Petros | B33Y 10/00 |
| 2021/0197477 A1* | 7/2021 | Pourcher | B22F 10/70 |

FOREIGN PATENT DOCUMENTS

| | | | |
|---|---|---|---|
| CN | 104028711 B | | 5/2016 |
| CN | 105710294 | * | 6/2016 |
| CN | 105710294 A | | 6/2016 |
| CN | 106363128 A | | 2/2017 |
| CN | 206186367 U | | 5/2017 |
| CN | 106827519 A | | 6/2017 |
| CN | 107498854 A | | 12/2017 |
| CN | 107599384 A | | 1/2018 |
| CN | 108000870 A | | 5/2018 |
| CN | 108480562 A | | 9/2018 |
| CN | 208357731 U | | 1/2019 |
| EP | 2892708 A | | 7/2015 |
| JP | 2017536259 A | | 12/2017 |
| RU | 2631793 C1 | | 9/2017 |
| RU | 2640551 C1 | | 1/2018 |
| WO | 2015151832 A | | 10/2015 |
| WO | 2017177603 A | | 10/2017 |

OTHER PUBLICATIONS

International Search Report and Written Opinion for International Application No. PCT/CN2019/088412, dated Jul. 30, 2019, ISA/CN.

European Search Report for corresponding European application No. EP19151441.3, dated Sep. 3, 2019, European Patent Office.

Office Action dated Jun. 11, 2019 for corresponding European application No. EP19151441.3, European Patent Office.

Office Action dated Mar. 26, 2020 for corresponding European application No. EP19151441.3, European Patent Office.

Office Action dated Jan. 20, 2020 for corresponding Japanese application No. 2019-014185, Japanese Patent Office.

Decision to Grant notice dated Jul. 15, 2021 for corresponding European application No. EP19151441.3, European Patent Office.

Decision to Grant notice dated Jun. 11, 2020 for corresponding Japanese application No. 2019-014185, Japanese Patent Office.

* cited by examiner

3D PRINTING APPARATUS, PRODUCTION LINE USING THE APPARATUS, AND CYCLICAL PRINTING METHOD THEREOF

CROSS-REFERENCE TO RELATED APPLICATIONS

This application is a 371 U.S. National Phase Entry Application of PCT/CN2019/088412, filed May 24, 2019, which claims the priority from Chinese Patent Application No. 201810520974.0 filed May 28, 2018 and Chinese Patent Application No. 201820799671.2, filed May 28, 2018, the contents of each of which are incorporated herein by reference.

TECHNICAL FIELD

The present disclosure relates to the technical field of material additive manufacturing, and particularly to a 3D printing apparatus, a production line using the apparatus, and a cyclical printing method thereof.

BACKGROUND ART

As one of the methods of material additive manufacturing, 3D printing technology becomes plays a more and more important role in modern manufacturing industry, which shortens development cycles of new products, and also saves development costs.

The working efficiency of a 3D printing apparatus is not only related with the design of the apparatus itself, but also related with the layout of the production line using the production site and associated auxiliary systems thereof. The unreasonableness of the layout of the production line using the 3D printing apparatus is a key factor that restricts the efficiency of 3D printing.

SUMMARY

The objects of the present disclosure include providing, for example, in view of the problem in the prior art that the unreasonable arrangement of 3D printing apparatuses restricts the efficiency of 3D printing, a 3D printing apparatus that allows for intensive production line arrangement, so as to improve the production efficiency of 3D printing.

The objects of the present disclosure further include providing a production line using the 3D printing apparatus, which can effectively improve the production efficiency of 3D printing. The objects of the present disclosure further include providing a cyclical printing method for the production line, by which method the production efficiency of 3D printing can be effectively improved.

In order to achieve the above objects, embodiments of the present disclosure may be implemented as follows:

An embodiment of the present disclosure provides a 3D printing apparatus, comprising a frame assembly, and a powder spreading unit, a powder supply device, an inkjet unit, an inkjet movement system, a working box, a transfer unit, an inner lifting mechanism, an outer lifting mechanism, an accessory unit and an auxiliary unit that are mounted on the frame assembly. In the above, the frame assembly comprises an upper layer frame and a lower layer frame, the powder spreading unit is connected with the lower layer frame by means of a powder spreading movement system and can move in a Y direction, the inkjet unit is connected with the upper layer frame by means of the inkjet movement system and can reciprocate in X direction and Y direction, the transfer unit comprises an outer roller table and an inner roller table that are configured to convey the working box and each comprise a driving mechanism, the inner roller table is provided in the lower layer frame below the powder spreading unit, the outer roller table is engaged with the inner roller table, the inner lifting mechanism is provided below the inner roller table, and the outer lifting mechanism is provided below the outer roller table.

In the 3D printing apparatus in the embodiment of the present disclosure, the working box is mainly provided to contain powder materials involved in sand printing and printed models; the inner lifting mechanism is mainly involved in a lifting and lowering movement for constructing a material surface in the printing process of the apparatus; the outer lifting mechanism is mainly involved in the lifting and lowering movement during the subsequent processing on the models after completion of the printing of the apparatus; the outer roller table is mainly involved in supporting of the working box and movement of the working box to a post-processing station after the completion of powder spreading printing; the inner roller table is mainly involved in supporting of the working box in a printing area and the movement of the working box to get out of the printing area; the lower layer frame is mainly configured to fix the inner lifting mechanism, the inner roller table and necessary auxiliary unit; the upper layer frame is mainly configured to support the powder spreading movement system, the powder spreading unit and necessary protective devices; the inkjet movement system is mainly involved in X-direction and/or Y-direction movement of the inkjet unit in the printing area; the powder spreading unit is mainly involved in dropping the powder in a powder spreading area of the working box and flattening the powder fallen onto the powder spreading area; the powder supply device is mainly involved in mixing well the powder and the additives and then supplying them to the powder spreading unit; the auxiliary unit mainly comprises a washing device and a cleaning device, wherein the washing device is mainly configured to remove, in the printing process, the impurities adhering to the inkjet head (nozzle) of the inkjet unit that adversely affect the liquid ejection, and serves a function of protection when the inkjet unit is in an idle state; the cleaning device is configured to clean a sand scraper bottom plate of the powder spreading unit and sweep out impurities therefrom; and the inkjet unit is mainly involved in applying the materials (in solid and/or liquid and/or gaseous state) in the container carried thereon onto powder surfaces of patterned slice regions. In the 3D printing apparatus of the present embodiment, at the time of performing 3D printing, the working box is conveyed to the printing station by means of the outer roller table and the inner roller table, 3D powder spreading printing of a model can be completed according to the printing program of the apparatus by starting the 3D printing apparatus, after the completion of the printing, the working box is pushed onto the inner roller table by means of the inner lifting mechanism, then conveyed to the outer roller table by means of the inner roller table, and then is subjected to scattered sand removal at the outer roller table and the outer lifting mechanism by means of sand blowing and sand cleaning devices, thereafter the working box together with the printed model is transferred to the outside, then the empty working box is transferred to the outer roller table and then conveyed, by the inner roller table, to the printing station for next round of 3D printing.

Optionally, a sand cleaning device is provided at a side of the outer lifting mechanism of the 3D printing apparatus.

Optionally, the powder supply device is connected with the upper layer frame and configured to supply powder to the powder spreading unit.

Optionally, the upper layer frame is configured to support the powder spreading movement system and the powder spreading unit.

Optionally, the lower layer frame is configured to fix the inner lifting mechanism, the inner roller table, and the auxiliary unit.

Optionally, the auxiliary unit comprises a washing device and a cleaning device, wherein the washing device is configured to remove, in the printing process, the impurities adhering to the inkjet head of the inkjet unit that adversely affect the liquid ejection; and the cleaning device is configured to clean a sand scraper bottom plate of the powder spreading unit and sweep out impurities therefrom.

The present embodiment further provides a production line using a plurality of 3D printing apparatuses described above, further comprising an intermediate transfer device, wherein both sides of the intermediate transfer device are provided with a plurality of 3D printing apparatuses, a transition roller table is provided at the junction between the intermediate transfer device and the outer roller table of each of the 3D printing apparatuses, two ends of the intermediate transfer device in the transferring and conveying direction respectively extend beyond areas of each of the 3D printing apparatuses, with the areas arranged in the same direction, one end of the intermediate transfer device is perpendicularly provided with collecting and distributing roller table for empty working box, the other end of the intermediate transfer device is perpendicularly provided with an intermediate roller table, a first direction-changing device and a second direction-changing device are provided at the positions where the intermediate transfer device perpendicularly intersects the collecting and distributing roller table for empty working box and the intermediate roller table, respectively, the collecting and distributing roller table for empty working box extends symmetrically towards both ends and extends beyond areas of each of the 3D printing apparatuses, with the areas arranged in the transferring and conveying direction and the collecting and distributing roller table for empty working box is connected with an transfer roller table for empty working box by means of a third direction-changing device, and the conveying direction of the transfer roller table for empty working box is perpendicular to the conveying direction of the collecting and distributing roller table for empty working box; a storage area is provided in an area where the intermediate roller table perpendicularly intersects a respective transfer roller table for empty working box; and baking devices are provided on both sides of each intermediate roller table respectively, and a sand cleaning device is provided at a side of the outer lifting mechanism of the 3D printing apparatus. In the production line arrangement system of the present embodiment, a plurality of 3D printing apparatuses and baking devices are planned and arranged in a centralized manner, and form a closed-loop production system by means of a plurality of conveying and transferring routes, which reduces the idle time of some of the apparatuses during production and improves the use efficiency of the apparatuses, thereby realizing 3D printing of high efficiency.

In order to reasonably meet the needs of the production line, optionally, a plurality of working boxes are provided on the collecting and distributing roller table for empty working box, and the total number of working boxes provided is 1.5-2 times as large as the total number of 3D printing apparatuses arranged.

Optionally, both ends of the intermediate roller table are provided with the storage areas respectively.

Optionally, a plurality of 3D printing apparatuses are provided between the intermediate transfer device and each transfer roller table for empty working box, and the plurality of 3D printing apparatuses are uniformly distributed in the transferring and conveying direction of the intermediate transfer device.

In order to improve the production efficiency of the production line, the present embodiment further provides a cyclical printing method for the production line, comprising the following process: at the beginning of printing, the starting position of an empty working box is located at the collecting and distributing roller table for empty working box, when an idle 3D printing apparatus being ready for printing on the production line, the empty working box is conveyed from the collecting and distributing roller table for empty working box to the intermediate transfer device via the first direction-changing device and then transferred to the outer roller table of a corresponding 3D printing apparatus, when the empty working box is conveyed to the inner roller table via the outer roller table and is aligned with the printing station above the inner lifting mechanism, 3D printing with a set program is started, after the completion of the printing, the working box is conveyed to the outer roller table via the inner roller table, for operations of scattered sand cleaning and residual powder removal in the working box, thereafter, the working box enters the intermediate transfer device, changes its direction by 90° by means of the second direction-changing device, and is conveyed, in the direction of the intermediate roller table on one side thereof, into an idle baking device for baking, after the completion of baking, the working box is transferred to the respective storage area via the intermediate roller table, and the printed models are collectively stored in the storage area; and in the storage area, after the printed models are taken out from the working box, the working box is conveyed by means of the transfer roller table for empty working box and is returned, via the third direction-changing device, to the collecting and distributing roller table for empty working box to perform next printing. In the cyclical printing method of this embodiment, according to the idle condition of the 3D printing apparatuses and the baking devices on the production line, the empty working boxes and the to-be-baked working boxes are timely conveyed and supplied to the corresponding idle apparatuses, so that the utilization rate of the main apparatuses on the production line is high, thereby improving the efficiency of the production line.

The present embodiment further provides a second production line using the 3D printing apparatus described above, further comprising an intermediate transfer device, wherein both sides of the intermediate transfer device are provided with a plurality of 3D printing apparatuses, a sand cleaning device is provided at a side of the outer lifting mechanism of each of the 3D printing apparatuses, a transition roller table is provided at the junction between the intermediate transfer device and the outer roller table of each of the 3D printing apparatuses, two ends of the intermediate transfer device in the transferring and conveying direction respectively extend beyond areas of each of the 3D printing apparatuses, with the areas arranged in the same direction, one end of the intermediate transfer device is provided with a first direction-changing device, one side of the first direction-changing device is provided with a transient storage roller table for to-be-baked working box, the other side of the first direction-changing device is provided with a transfer roller table and a collecting and distributing roller table for empty working box that are arranged in parallel, the other end of the transfer roller table and the collecting and distributing roller table for empty working box is provided with a storage area, and the outer side of the first direction-changing device relative to the intermediate transfer device is provided with a baking device. In the production line arrangement solution as described above, a plurality of 3D printing apparatuses and baking devices are planned and arranged in a centralized manner, and form a semi-closed-loop cyclical production system by means of two conveying lines in the perpendicular direction, which reduces the idle time of some of the apparatuses during production and improves the use efficiency of the apparatuses, thereby realizing 3D printing of high efficiency.

Optionally, the plurality of 3D printing apparatuses are uniformly distributed in the transferring and conveying direction of the intermediate transfer device.

Optionally, the conveying direction of the transfer roller table, the conveying direction of the collecting and distributing roller table for empty working box and the conveying direction of the transient storage roller table for to-be-baked working box are parallel with each other, and the conveying direction of the intermediate transfer device is perpendicular to the conveying direction of the transient storage roller table for to-be-baked working box.

The present embodiment further provides a cyclical printing method using the second production line as described above: at the beginning of printing, the starting position of a working box is located at the collecting and distributing roller table for empty working box, when an idle 3D printing apparatus being on the production line, the empty working box enters the outer roller table and the inner roller table of the idle 3D printing apparatus via the first direction-changing device and the intermediate transfer device, and then enters a printing area for 3D printing; after the completion of the printing, one of two routes is selected for the working box according to the difference of the solidification requirements of the materials in the box, wherein the first route is that the working box is subjected to scattered sand removal at the outer lifting mechanism, then the working box enters, again via the intermediate transfer device and the first direction-changing device, the baking device for baking, the baked working box further enters the storage area via the first direction-changing device and the transfer roller table, the printed models in the working box are taken out and stored in the storage area, and the empty working box returns to the collecting and distributing roller table for empty working box to wait for next cyclical printing; and the second route is that the working box enters the intermediate transfer device from the outer roller table of the 3D printing apparatus, passes through the first direction-changing device and then enters the baking device, and the baked working box further returns, again via the first direction-changing device and the intermediate transfer device, to the outer lifting mechanism of the idle 3D printing apparatus on the production line for scattered sand removal, then passes again through the intermediate transfer device, the first direction-changing device and the transfer roller table, and enters the storage area, the printed models in the working box are taken out and stored in the storage area, and the empty working box returns to the collecting and distributing roller table for empty working box to wait for next cyclical printing. In the cyclical printing method for the above-described production line in this embodiment, two different routes for cyclical printing are provided in consideration of the difference in bonding and solidification time between the powder spreading materials used for printing and the printing materials, in order to meet the requirements of different solidification time, wherein the first route is suitable for 3D printing with powder spreading printing materials having short solidification time, and the second route is suitable for 3D printing with powder spreading printing materials having long solidification time.

Compared with the prior art, the advantageous effects of the embodiments of the present disclosure include, for example:

With regard to the 3D printing apparatus in this embodiment, at the time of performing 3D printing, the working box is conveyed to the printing station by means of the outer roller table and the inner roller table, 3D powder spreading printing of a model can be completed according to the printing program of the apparatus by starting the 3D printing apparatus, after the completion of the printing, the working box is pushed onto the inner roller table by means of the inner lifting mechanism, then conveyed to the outer roller table by means of the inner roller table, and then is subjected to scattered sand removal at the outer roller table and the outer lifting mechanism by means of sand blowing and sand cleaning devices, thereafter the working box together with the printed model is transferred to the outside, then the empty working box is transferred to the outer roller table and then conveyed, via the inner roller table, to the printing station for next round of 3D printing. The 3D printing apparatus allows for intensive production line arrangement, and can improve the production efficiency of 3D printing.

With regard to the first production line using the above-described 3D printing apparatus in this embodiment, a plurality of 3D printing apparatuses and baking devices are planned and arranged in a centralized manner, and form a closed-loop production system by means of a plurality of conveying and transferring routes, which reduces the idle time of some of the apparatuses during production and improves the use efficiency of the apparatuses, thereby realizing 3D printing of high efficiency.

With regard to the cyclical printing method using the above-described first production line in this embodiment, according to the idle condition of the 3D printing apparatuses and the baking devices on the production line, the empty working boxes and the to-be-baked working boxes are timely conveyed and supplied to the corresponding idle apparatuses, so that the utilization rate of the main apparatuses on the production line is high, thereby improving the efficiency of the production line.

With regard to the second production line using the above-described 3D printing apparatus in this embodiment, a plurality of 3D printing apparatuses and baking devices are planned and arranged in a centralized manner, and form a closed-loop production system by means of a plurality of conveying and transferring routes, which reduces the idle time of some of the apparatuses during production and improves the use efficiency of the apparatuses, thereby realizing 3D printing of high efficiency.

With regard to the cyclical printing method using the above-described second production line in this embodiment, two different routes for cyclical printing are provided in consideration of the difference in bonding and solidification time between the powder spreading materials used for printing and the printing materials, in order to meet the requirements of different solidification time, wherein the first route is suitable for 3D printing with powder spreading printing materials having short solidification time, and the second route is suitable for 3D printing with powder spreading printing materials having long solidification time.

BRIEF DESCRIPTION OF DRAWINGS

In order to more clearly illustrate the technical solutions of the embodiments of the present disclosure, brief description is made below on the drawings required to be used in the embodiments. It should be understood that the following drawings only illustrate some of the embodiments of the present disclosure and therefore shall not be construed as a limitation on the scope. For a person of ordinary skills in the art, other relevant drawings may be obtained from these drawings without using inventive effort.

Figure 1:
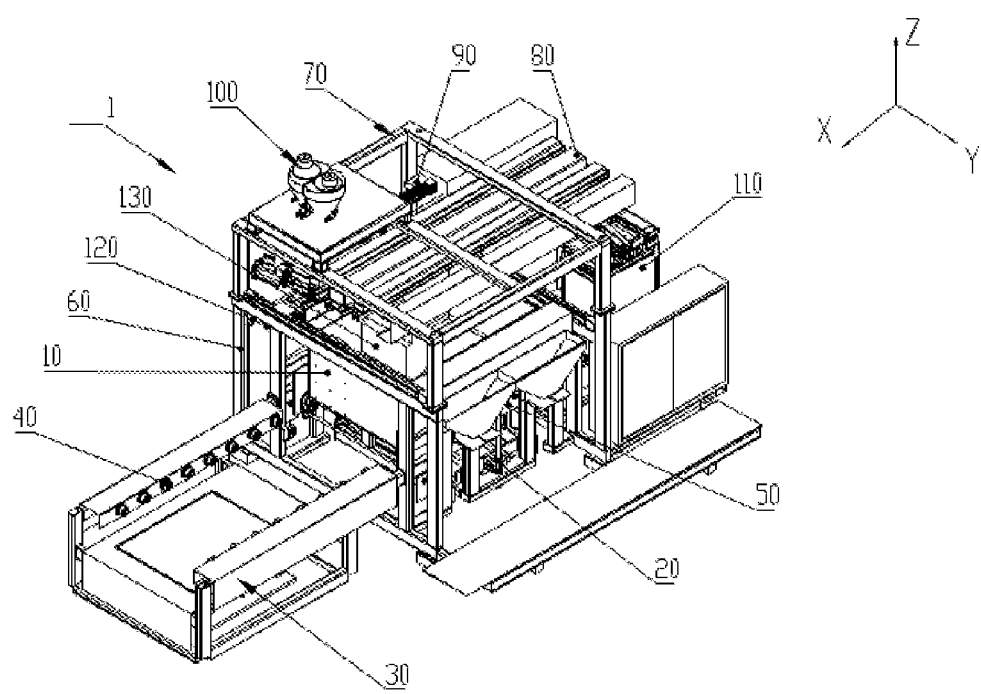
FIG. 1 is a structural schematic diagram of a 3D printing apparatus of the present embodiment.

Reference signs: 1—3D printing apparatus; 10—working box; 20—inner lifting mechanism; 30—outer lifting mechanism; 40—outer roller table; 50—inner roller table; 60—lower layer frame; 70—upper layer frame; 80—inkjet movement system; 90—powder spreading unit; 100—powder supply device; 110—washing device; 120—cleaning device; 130—inkjet unit; 2—intermediate transfer device; 3—collecting and distributing roller table for empty working box; 4—transfer roller table for empty working box; 5—storage area; 6—intermediate roller table; 7—baking device; 8—first direction-changing device; 9—second direction-changing device; 11—third direction-changing device; 12—transfer roller table; and 13—transient storage roller table for to-be-baked working box.

DETAILED DESCRIPTION OF EMBODIMENTS

In order to make the objects, technical solutions and advantages of the embodiments of the present disclosure clearer, the technical solutions of the embodiments of the present disclosure will be described clearly and completely below with reference to the drawings of the embodiments of the present disclosure. Apparently, the embodiments described are some of the embodiments of the present disclosure, rather than all of the embodiments. The components of the embodiments of the present disclosure described and illustrated in the drawings herein can generally be arranged and designed in a variety of different configurations.

Thus, the following detailed description of the embodiments of the present disclosure provided in the drawings is not intended to limit the scope of the present disclosure claimed, but is merely representative of the selected embodiments of the present disclosure. All the other embodiments that are obtained by a person of ordinary skills in the art without using inventive effort on the basis of the embodiments of the present disclosure shall be covered by the scope of protection of the present disclosure.

It should be noted that like reference signs and letters denote like items in the subsequent drawings, and therefore, once a certain item is defined in one figure, it does not need to be further defined or explained in the following figures.

In the description of the present disclosure, it is to be noted that the orientation or position relation denoted by the terms such as "center", "upper", "lower", "left", "right", "vertical", "horizontal", "inner" and "outer" (if present) is based on the orientation or position relation indicated by the figures, or refers to the orientation or position where the product of the present disclosure is normally placed when in use, which only serves to facilitate describing the present disclosure and simplify the description, rather than indicating or implying that the device or element referred to must have a particular orientation, and is constructed and operated in a particular orientation, and therefore cannot be construed as a limitation on the present disclosure.

In addition, the terms such as "first", "second" and "third" (if present) are only used for differentiated description and cannot be understood as an indication or implication of relative importance.

In addition, the terms such as "horizontal", "vertical" and "pendulous" (if present) do not necessarily require that the components must be absolutely horizontal or pendulous, rather, they can be slightly inclined. For example, the term "horizontal" merely refers to a more horizontal direction relative to the direction indicated by the term "vertical", and does not necessarily require that the structure must be absolutely horizontal, rather, it can be slightly inclined.

In the description of the present disclosure, it should be further noted that unless otherwise explicitly specified and defined, the terms "arrange", "install", "link" and "connect" (if present) shall be understood in broad sense, which may, for example, refer to fixed connection, detachable connection or integral connection; may refer to mechanical connection or electrical connection; may refer to direct connection or indirect connection by means of an intermediate medium; and may refer to communication between two elements. A person of ordinary skills in the art could understand the specific meaning of the terms in the present disclosure according to specific situations.

It should be noted that the features of the embodiments of the present disclosure can be combined with each other if there is no conflict.

Embodiment 1

Figure 2:
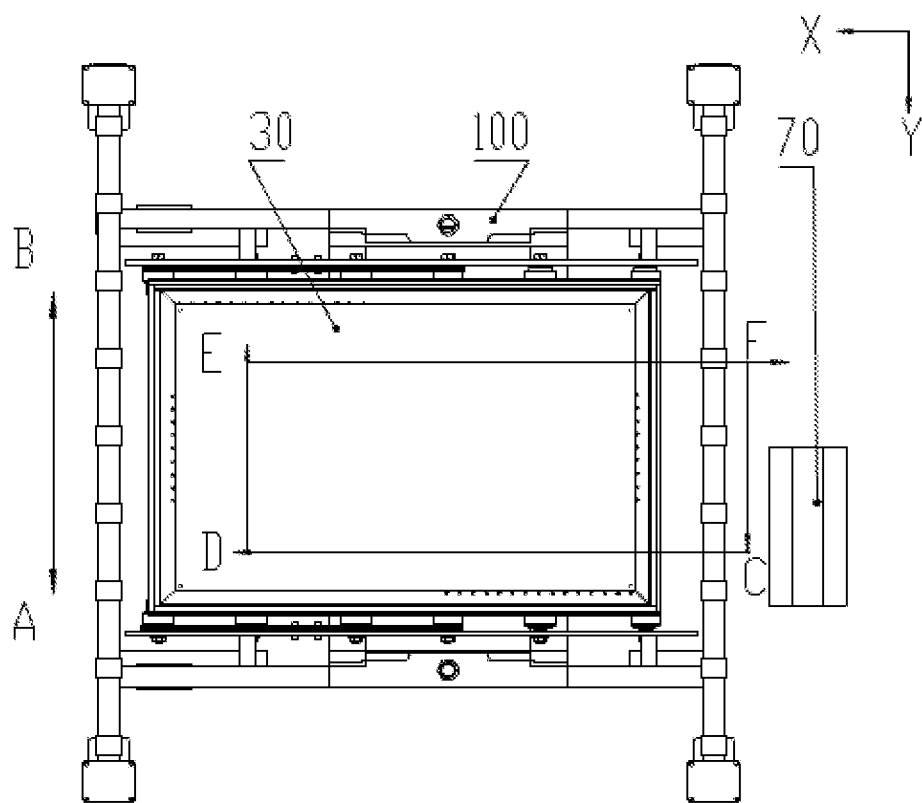
FIG. 2 is a schematic diagram of an operation route of a powder spreading unit and an inkjet unit of the 3D printing apparatus of the present embodiment.
Figure 3:
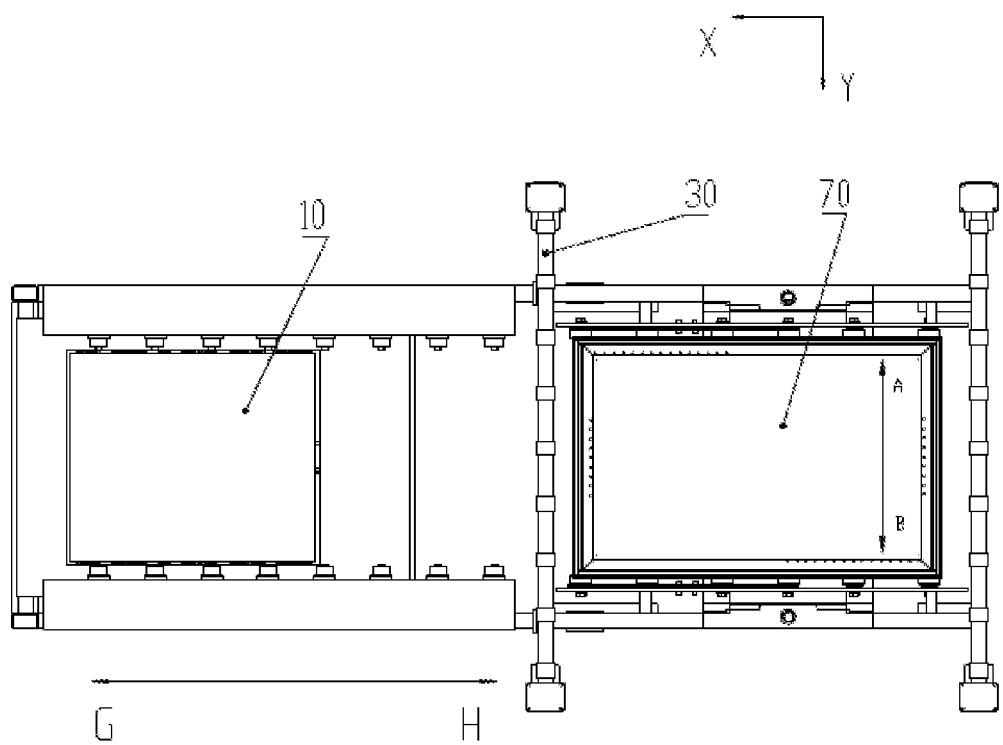
FIG. 3 is a schematic diagram of a movement direction of a working box entering a printing area.

As shown in FIG. 1-FIG. 3, the present embodiment provides a 3D printing apparatus 1, which comprises a frame assembly, and a powder spreading unit 90, a powder supply device 100, an inkjet unit 130, an inkjet movement system 80, a working box 10, a transfer unit, an inner lifting mechanism 20, an outer lifting mechanism 30, an accessory unit and an auxiliary unit that are mounted on the frame assembly. In the above the frame assembly comprises an upper layer frame 70 and a lower layer frame 60, the powder spreading unit 90 is connected with the lower layer frame 60 by means of a powder spreading movement system and can move in a Y direction, the inkjet unit 130 is connected with the upper layer frame 70 by means of the inkjet movement system 80 and can reciprocate in X direction and Y direction, the transfer unit comprises an outer roller table 40 and an inner roller table 50 that are configured to convey the working box 10 and each comprise a driving mechanism, the inner roller table 50 is provided in the lower layer frame 60 below the powder spreading unit 90, the outer roller table 40 is engaged with the inner roller table 50 to facilitate the conveying of the working box 10, the inner lifting mechanism 20 is provided below the inner roller table 50, and the outer lifting mechanism 30 is provided below the outer roller table 40 to facilitate lifting and lowering of the working box 10.

In the 3D printing apparatus 1 of the present embodiment, the inkjet unit 130 is movable in both X direction and Y direction to realize printing movement of one closed loop on one powder spreading layer; the inkjet unit 130 is fixed to a movement unit of the inkjet movement system 80, and the inkjet unit 130 accomplishes reciprocating movement in the X direction and the Y direction under the driving of the movement unit of the inkjet movement system 80; and the inkjet unit 130 of the present embodiment may perform inkjet printing along a printing closed loop route in the direction of X→Y→X→Y or the direction of Y→X→Y→X, or simultaneously in the X direction and the Y direction.

The powder spreading unit 90 is driven by the powder spreading movement system to reciprocate in the Y direction to spread powder. For example, as shown in FIG. 2, the powder spreading unit 90 performs powder spreading movement in the A→B direction and stops, after completing the spreading of one layer of powder, at a position where the spreading of one layer of powder is finished, the inkjet unit 130 completes one printing cycle in the direction of C→D→E→F→C, wherein D→E and F→C are line feed routes (routes for line shifting) along which the printing head does print; and after the completion of inkjet printing, the inner lifting mechanism 20 drives the bottom plate of the working box 10 to lower the powder spreading layer to start printing of the second layer. After the completion of the printing, the working box 10 is output via the inner roller table 50 and the outer roller table 40 for sand cleaning and baking.

Moreover, a sand cleaning device is provided at a side of the outer lifting mechanism 30 of the 3D printing apparatus 1. The powder supply device 100 is connected with the upper layer frame 70 and is configured to supply powder to the powder spreading unit 90. The upper layer frame 70 is configured to support the powder spreading movement system and the powder spreading unit 90. The lower layer frame 60 is configured to fix the inner lifting mechanism 20, the inner roller table 50 and the auxiliary unit. The auxiliary unit comprises a washing device 110 and a cleaning device 120, wherein the washing device 110 is configured to remove, in the printing process, the impurities adhering to the inkjet head of the inkjet unit 130 that adversely affect the liquid ejection; and the cleaning device 120 is configured to clean a sand scraper bottom plate of the powder spreading unit 90 and sweep out impurities therefrom.

In this embodiment, the working box 10 is mainly configured to contain powder materials involved in sand printing and printed models; the inner lifting mechanism 20 is mainly involved in a lifting and lowering movement for constructing a material surface in the printing process of the apparatus; the outer lifting mechanism 30 is mainly involved in the lifting and lowering movement during the subsequent processing on the models after completion of the printing of the apparatus; the outer roller table 40 is mainly involved in supporting of the working box 10 and the movement of the working box 10 to a post-processing station after completion of powder spreading printing; the inner roller table 50 is mainly involved in the supporting of the working box 10 in a printing area and the movement of the working box 10 to get out of the printing area; the lower layer frame 60 is mainly configured to fix the inner lifting mechanism 20, the inner roller table 50 and necessary auxiliary unit; the upper layer frame 70 is mainly configured to support the powder spreading movement system, the powder spreading unit 90 and necessary protective devices; the inkjet movement system 80 is mainly involved in X-direction and/or Y-direction movement of the inkjet unit 130 in the printing area; the powder spreading unit 90 is mainly involved in dropping the powder in a powder spreading area of the working box 10 and flattening the powder fallen onto the powder spreading area; the powder supply device 100 is mainly involved in mixing well the powder and the additives and then supplying them to the powder spreading unit 90; the auxiliary unit mainly comprises a washing device 110 and a cleaning device 120, wherein the washing device 110 is mainly configured to remove, in the printing process, the impurities adhering to the inkjet head of the inkjet unit 130 that adversely affect the liquid ejection, and serves a function of protection when the inkjet unit 130 is in an idle state; the cleaning device 120 is configured to clean a sand scraper bottom plate of the powder spreading unit 90 and sweep out impurities therefrom; and the inkjet unit 130 is mainly involved in applying the materials (in solid and/or liquid and/or gaseous state) in the container carried thereon onto powder surfaces of patterned slice regions.

Embodiment 2

Figure 4:
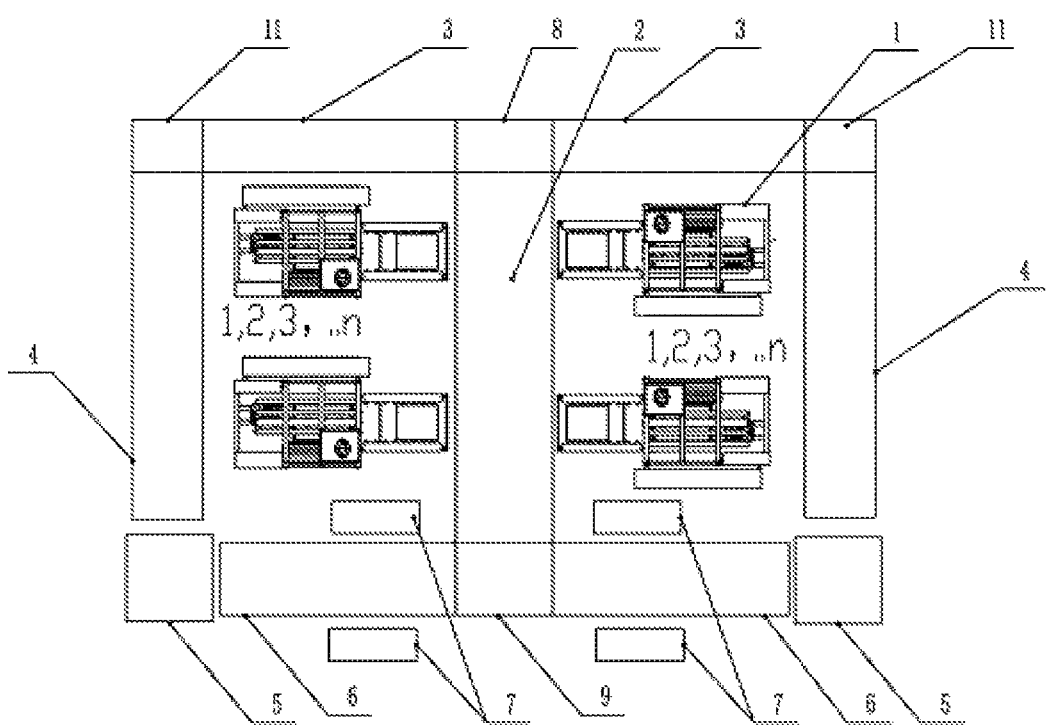
FIG. 4 is a schematic diagram of an arrangement of the first production line using the 3D printing apparatus of the present embodiment.

A production line arranged using the 3D printing apparatus 1 of Embodiment 1 is shown in FIG. 4. The production line further comprises an intermediate transfer device 2, wherein both sides of the intermediate transfer device 2 are provided with a plurality of 3D printing apparatuses 1 described in Embodiment 1, a transition roller table is provided at the junction between the intermediate transfer device 2 and the outer roller table 40 of each of the 3D printing apparatuses 1, two ends of the intermediate transfer device 2 in the transferring and conveying direction respectively extend beyond areas of each of the 3D printing apparatuses 1, with the areas arranged in the same direction, one end of the intermediate transfer device 2 is perpendicularly provided with an collecting and distributing roller table 3 for empty working box, the other end of the intermediate transfer device 2 is perpendicularly provided with an intermediate roller table 6, a first direction-changing device 8 and a second direction-changing device 9 are provided at the positions where the intermediate transfer device 2 perpendicularly intersects the collecting and distributing roller table for empty working box 3 and the intermediate roller table 6, respectively, the collecting and distributing roller table 3 for empty working box extends symmetrically towards both ends and extends beyond areas of each of the 3D printing apparatuses 1, with the areas arranged in the transferring and conveying direction and the collecting and distributing roller table for empty working box is connected with an transfer roller table for empty working box 4 by means of a third direction-changing device 11, and the conveying direction of the transfer roller table for empty working box 4 is perpendicular to the conveying direction of the collecting and distributing roller table 3 for empty working box; a storage area 5 is provided in an area where the intermediate roller table 6 perpendicularly intersects a respective transfer roller table for empty working box 4; and baking devices 7 are provided on both sides of each intermediate roller tables 6 respectively, and a sand cleaning device is provided at a side of the outer lifting mechanism 30 of the 3D printing apparatus 1 is laterally, which device is configured to clean scattered sand after the completion of powder spreading printing.

In this embodiment, a plurality of empty working boxes 10 are provided on the collecting and distributing roller table 3 for empty working box, and the total number of working boxes 10 provided is 1.5-2 times as large as the total number of 3D printing apparatuses 1 arranged on the production line, in order to meet requirements of cyclical printing on the production line. For example, when the number of 3D printing apparatuses 1 equal to 1, the number of working boxes 10 is 2, when the number of 3D printing apparatuses 1 is equal to 2, the number of working boxes 10 is 3 or 4, and when the number of 3D printing apparatuses 1 is equal to 3, the number of working boxes 10 is 5 or 6.

Moreover, in FIG. 4, both ends of the intermediate roller table 6 are provided with the storage areas 5 respectively. A plurality of 3D printing apparatuses 1 are provided between the intermediate transfer device 2 and each transfer roller table for empty working box 4, and the plurality of 3D printing apparatuses 1 are uniformly distributed in the transferring and conveying direction of the intermediate transfer device 2.

In the production line arrangement system of the present disclosure, according to the number of 3D printing apparatuses 1 arranged on the production line, a suitable number of baking devices 7 are provided on the two sides of the intermediate roller table 6, which are configured for solidification and bonding between the ink and the powder inside the model after 3D printing, a plurality of empty working boxes 10 are placed on the collecting and distributing roller table 3 for empty working box and are configured to be conveyed to each of the 3D printing apparatuses 1 ready for printing so as to be subjected to powder spreading printing, and each of the storage areas 5 is configured to store the printed and baked model products. Therefore, for the production line arrangement system of the present disclosure, according to characteristics of procedure of the 3D model printing, a plurality of 3D printing apparatuses 1 and baking devices 7 are planned and arranged in a centralized manner, and form a closed-loop production system by means of a plurality of conveying and transferring routes, such that the working boxes 10 are cyclically used on the production line and supplied to idle 3D printing apparatuses 1 in a timely manner, which reduces the idle time of each apparatus during production and improves the use efficiency of the apparatuses, thereby realizing 3D printing of high efficiency on the production line.

Embodiment 3

This embodiment is a cyclical printing method for the 3D printing production line in Embodiment 2, which comprises following process: at the beginning of printing, a starting position of an empty working box 10 is located at the collecting and distributing roller table 3 for empty working box, when an idle 3D printing apparatus 1 being ready for printing on the production line, the empty working box 10 is conveyed from the collecting and distributing roller table 3 for empty working box to the intermediate transfer device 2 via the first direction-changing device 8 and then transferred to an outer roller table 40 of a corresponding 3D printing apparatus 1, when the empty working box 10 is conveyed to the inner roller table 50 via the outer roller table 40 and is aligned with the printing station above the inner lifting mechanism 20, 3D printing with a set program is started, after the completion of the printing, the working box 10 is conveyed to the outer roller table 40 again via the inner roller table 50, for scattered sand cleaning and residual powder removal in the empty working box 10, thereafter, the working box 10 enters the intermediate transfer device 2, changes its direction by 90° by means of the second direction-changing device 9, and is conveyed, in the direction of the intermediate roller table 6 on one side thereof, into an idle baking device 7 for baking, after the completion of baking, the working box 10 is transferred to a storage area 5 again via the intermediate roller table 6, and printed models are collectively stored in the storage area 5; and in the storage area 5, after the printed models are taken out from the working box 10 manually or by automation equipment, the empty working box 10 is conveyed through the transfer roller table for empty working box 4 and is returned, via the third direction-changing device 11, to the collecting and distributing roller table 3 for empty working box to wait for next printing. In the printing method of the present disclosure, according to the idle condition of the 3D printing apparatuses 1 and the baking devices 7 on the production line, empty working boxes 10 and to-be-baked working boxes 10 are timely conveyed and supplied to the corresponding idle apparatuses respectively, so that the utilization rate of main apparatuses on the production line is improved, thereby improving the efficiency of the production line.

Embodiment 4

Figure 5:
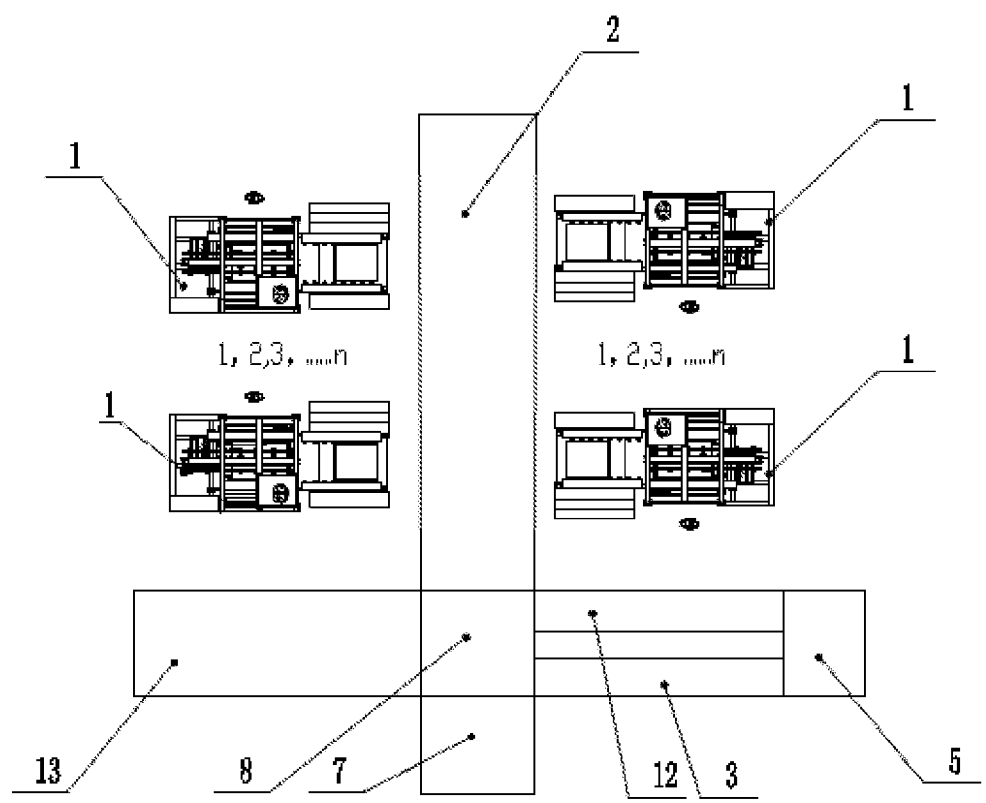
FIG. 5 is a schematic diagram of an arrangement of the second production line using the 3D printing apparatus of the present embodiment.

The second case of the production line arranged using the 3D printing apparatus 1 of Embodiment 1 is shown in FIG. 5, which further comprises an intermediate transfer device 2, wherein two ends of the intermediate transfer device 2 are provided with a plurality of 3D printing apparatuses 1, a sand cleaning device is provided at a side of the outer lifting mechanism 30 of each of the 3D printing apparatus 1, a transition roller table is provided at the junction between the intermediate transfer device 2 and the outer roller table 40 of each of the 3D printing apparatuses 1, two ends of the intermediate transfer device 2 in the transferring and conveying direction respectively extend beyond areas of the 3D printing apparatus 1, with the areas arranged in the transferring and conveying direction, one end of the intermediate transfer device 2 is provided with a first direction-changing device 8, one side of the first direction-changing device 8 is provided with a transient storage roller table 13 for to-be-baked working box, the other side of the first direction-changing device 8 is provided with a transfer roller table 12 and a collecting and distributing roller table 3 for empty working box that are arranged in parallel, the other end of the transfer roller table 12 and the collecting and distributing roller table 3 for empty working box is provided with a storage area 5, and the outer side of the first direction-changing device 8 relative to the intermediate transfer device 2 is provided with a baking device 7.

In FIG. 5, the transfer roller table 12 and the collecting and distributing roller table 3 for empty working box are both linear, and the storage area 5 is located at one end of the transfer roller table 12 and the collecting and distributing roller table 3 for empty working box, with the end away from the first direction-changing device 8.

In FIG. 5, the plurality of 3D printing apparatuses 1 are uniformly distributed in the transferring and conveying direction of the intermediate transfer device 2. The conveying direction of the transfer roller table 12, the conveying direction of the collecting and distributing roller table 3 for empty working box and the conveying direction of the transient storage roller table 13 for to-be-baked working box are parallel with each other, and the conveying direction of the intermediate transfer device 2 is perpendicular to the conveying direction of the transient storage roller table 13 for to-be-baked working box.

Embodiment 5

The present embodiment is a cyclical printing method using the production line arrangement solution in Embodiment 4, which comprises following process: at the beginning of printing, the starting position of a working box 10 is located at the collecting and distributing roller table 3 for empty working box, when an idle 3D printing apparatus 1 being on the production line, the empty working box 10 enters the outer roller table 40 and the inner roller table 50 of the idle 3D printing apparatus 1 via the first direction-changing device 8 and the intermediate transfer device 2, and then enters a printing area for 3D printing; after the completion of the printing, one of two routes is selected for the working box 10 according to the difference of the solidification requirement of the materials in the box, wherein the first route is that the working box 10 is subjected to scattered sand removal at the outer lifting mechanism 30, then the resultant working box 10 arrives at the first direction-changing device 8 via the intermediate transfer device 2, when the baking device 7 is idle, the working box 10 directly enters the baking device 7 for baking, when the baking device 7 is in operation, the working box 10 to be baked is transferred to the transient storage 13 roller table for to-be-baked working box, and then transferred into the baking device 7 when the baking device 7 is idle, the baked working box 10 further enters the storage area 5 via the first direction-changing device 8 and the transfer roller table 12, the printed models in the working box 10 are taken out and stored in the storage area 5, and the empty working box 10 returns to the collecting and distributing roller table 3 for empty working box to wait for next cyclical printing; and the second route is that the working box 10 enters the intermediate transfer device 2 from the outer roller table 40 of the 3D printing apparatus 1 and arrives at the first direction-changing device 8, when the baking device 7 is idle, the working box 10 directly enters the baking device 7 for baking, when the baking device 7 is in operation, the working box 10 to be baked is transferred to the transient storage roller table 13 for to-be-baked working box, and then transferred to the baking device 7 when the baking device 7 is idle, the baked working box 10 further returns, again via the first direction-changing device 8 and the intermediate transfer device 2, to the outer lifting mechanism 30 of the idle 3D printing apparatus 1 on the production line for scattered sand removal, then passes through the intermediate transfer device 2, the first direction-changing device 8 and the transfer roller table 12, and enters the storage area 5, the printed models in the working box 10 are taken out and stored in the storage area 5, and the empty working box 10 returns to the collecting and distributing roller table 3 for empty working box to wait for next cyclical printing. In the above-described cyclical printing method for the production line in the present disclosure, two different routes for cyclical printing are provided in consideration of the difference in bonding and solidification time between the powder spreading materials used for printing and the printing materials, in order to meet the requirement of different solidification time, wherein the first route is suitable for 3D printing with powder spreading printing materials having short solidification time, and the second route is suitable for 3D printing with powder spreading printing materials having long solidification time.

In Some Embodiments

Referring to FIG. 1, the 3D printing apparatus 1 shown in FIG. 1 comprises a working box 10, an inner lifting mechanism 20, an outer lifting mechanism 30, an outer roller table 40, an inner roller table 50, a lower layer frame 60, an upper layer frame 70, an inkjet movement system 80, a powder spreading unit 90, a powder supply device 100, a washing device 110, a cleaning device 120 and an inkjet unit 130. The working box 10 can enter or exit the lower layer frame 60 by means of the outer roller table 40 and the inner roller table 50 that each comprises a driving mechanism, the inner lifting mechanism 20 is provided below the inner roller table 50, the outer lifting mechanism 30 is provided below the outer roller table 40, and the lower layer frame 60 is connected with the inner lifting mechanism 20, the inner roller table 50 and necessary auxiliary unit. The upper layer frame 70 is connected with a powder spreading movement system, the powder spreading unit 90 and necessary protective devices. The inkjet movement system 80 is connected to the upper layer frame 70. The powder spreading unit 90 is connected to the lower layer frame 60. The powder supply device 100 is connected to the upper layer frame 70. The washing device 110 is connected to the lower layer frame 60. The cleaning device 120 is connected to the lower layer frame 60. The inkjet unit 130 is connected to the upper layer frame 70.

Referring to FIG. 2, in the 3D printing apparatus 1 shown in FIG. 2, the powder spreading unit 90 performs a powder spreading movement in the A→B direction, and the inkjet unit 130 completes one printing cycle in the direction of C→D→E→F→C, wherein D→E and F→C are line feed routes along which the printing head does not print.

Referring to FIG. 3, in the 3D printing apparatus 1 shown in FIG. 3, the working box 10 enters the inner roller table 50 below the upper layer frame 70 in the G→H direction under the effect of the outer roller table 40 and the outer lifting mechanism 30, thereby realizing entering the printing area.

Referring to FIG. 4, FIG. 4 shows a production line using the above-described 3D printing apparatus 1, which comprises a plurality of 3D printing apparatuses 1, an intermediate transfer device 2, a collecting and distributing roller table 3 for empty working box, an transfer roller table for empty working box 4, storage areas 5, an intermediate roller table 6, a baking device 7, a first direction-changing device 8, a second direction-changing device 9, a third direction-changing device 11, a transfer roller table 12 and a transient storage roller table 13 for to-be-baked working box. The intermediate transfer device 2 is linear (that is, the conveying direction thereof is linear), the two ends of the intermediate transfer device 2 are provided with the collecting and distributing roller table 3 for empty working box and the intermediate roller table 6, respectively, both the collecting and distributing roller table 3 for empty working box and the intermediate roller table 6 are also linear and are both perpendicular to the intermediate transfer device 2, the first direction-changing device 8 is provided at a position where the intermediate transfer device 2 perpendicularly intersects the collecting and distributing roller table 3 for empty working box, and the second direction-changing device 9 is provided at a position where the intermediate transfer device 2 perpendicularly intersects the intermediate roller table 6. The intermediate transfer device 2, the collecting and distributing roller table 3 for empty working box, the intermediate roller table 6 and two transfer roller tables for empty working box 4 are distributed in a shape like two horizontally abutted squares, the plurality of 3D printing apparatuses 1 are located between the intermediate transfer device 2 and each transfer roller table for empty working box 4, and the plurality of 3D printing apparatuses 1 are distributed along the conveying direction of the intermediate transfer device 2. The storage area 5 is provided at both ends of the intermediate roller table 6, one end of each transfer roller table for empty working box 4 is connected with one end of the collecting and distributing roller table 3 for empty working box via the third direction-changing device 11, the other end of each transfer roller table for empty working box 4 is provided in correspondence to the respective storage area 5, each transfer roller table for empty working box 4 is linear, and is disposed perpendicularly to the collecting and distributing roller table 3 for empty working box, and baking devices 7 are provided on both sides of the intermediate roller table 6 respectively.

Referring to FIG. 5, FIG. 5 shows another production line using the above-described 3D printing apparatus 1, which comprises a plurality of 3D printing apparatuses 1, an intermediate transfer device 2, a collecting and distributing roller table 3 for empty working box, a storage area 5, a baking device 7, a first direction-changing device 8, a transfer roller table 12 and a transient storage roller table 13 for to-be-baked working box. The intermediate transfer device 2 is linear (that is, the conveying direction thereof is linear), one side of one end of the intermediate transfer device 2 is provided with the transient storage roller table 13 for to-be-baked working box, and the other side of this end of the intermediate transfer device 2 is provided with the transfer roller table 12 and the collecting and distributing roller table 3 for empty working box. The transient storage roller table 13 for to-be-baked working box is linear and is perpendicular to the intermediate transfer device 2. The transfer roller table 12 and the collecting and distributing roller table 3 for empty working box are both linear and are perpendicular to the intermediate transfer device 2. The first direction-changing device 8 is provided at the position where the transient storage roller table 13 for to-be-baked working box, the transfer roller table 12 and the collecting and distributing roller table 3 for empty working box perpendicularly intersect the intermediate transfer device 2, and an outer side of the first direction-changing device 8 relative to the intermediate transfer device 2 is provided with the baking device 7. The storage area 5 is provided at one end of the transfer roller table 12 and the collecting and distributing roller table 3 for empty working box, with the end away from the intermediate transfer device 2. A plurality of 3D printing apparatuses 1 are distributed on both sides of the intermediate transfer device 2, and the plurality of 3D printing apparatuses 1 are distributed in the conveying direction of the intermediate transfer device 2.

The above description is merely embodiments of the present disclosure, but the scope of protection of the present disclosure is not limited thereto. Any changes or replacements that would readily be conceivable to those skilled in the art within the technical scope disclosed by the present disclosure shall be covered by the scope of protection of the present disclosure. Therefore, the scope of protection of the present disclosure shall be determined by the scope of protection of the appended claims.

INDUSTRIAL APPLICABILITY

In summary, the present disclosure provides a 3D printing apparatus, a production line using the apparatus, and a cyclical printing method thereof, which are simple in structure and reasonable in design, and can effectively improve the production efficiency of 3D printing.

The invention claimed is:

1. A production line using a plurality of 3D printing apparatuses comprising an intermediate transfer device, wherein both sides of the intermediate transfer device are provided with the plurality of 3D printing apparatuses, a transition roller table is provided at a junction between the intermediate transfer device and an outer roller table of each of the plurality of 3D printing apparatuses, two ends of the intermediate transfer device in a transferring and conveying direction thereof respectively extend beyond areas of the 3D printing apparatus, with the areas arranged in a same direction, one end of the intermediate transfer device is perpendicularly provided with a collecting and distributing roller table for empty working box, the other end of the intermediate transfer device is perpendicularly provided with an intermediate roller table, a first direction-changing device and a second direction-changing device are provided at positions where the intermediate transfer device perpendicularly intersects the collecting and distributing roller table for empty working box and the intermediate roller table, respectively, the collecting and distributing roller table for empty working box extends symmetrically towards both ends and extends beyond areas of the 3D printing apparatus, with the areas arranged in the same direction and the collecting and distributing roller table for empty working box is connected with an transfer roller table for empty working box by means of a third direction-changing device, and a conveying direction of the transfer roller table for empty working box is perpendicular to a conveying direction of the collecting and distributing roller table for empty working box; a storage area is provided in an area where the intermediate roller table perpendicularly intersects a respective transfer roller table for empty working box; and baking devices are provided on both sides of each intermediate roller table, and a sand cleaning device is provided at a side of an outer lifting mechanism of the 3D printing apparatus, wherein each of the plurality of 3D printing apparatuses comprises a frame assembly, and a powder spreading unit, a powder spreading movement system, a powder supply device, an inkjet unit, an inkjet movement system, a working box, a transfer unit, an inner lifting mechanism, the outer lifting mechanism, an accessory unit and an auxiliary unit that are mounted on the frame assembly, wherein the frame assembly comprises an upper layer frame and a lower layer frame, the powder spreading unit is connected with the lower layer frame by means of the powder spreading movement system and can move in a Y direction, the inkjet unit is connected with the upper layer frame by means of the inkjet movement system and can reciprocate in a X direction and the Y direction, the transfer unit comprises the outer roller table and an inner roller table that each comprise a driving mechanism and are configured to convey the working box, the inner roller table is provided in the lower layer frame below the powder spreading unit, the outer roller table is engaged with the inner roller table, the inner lifting mechanism is provided below the inner roller table, and the outer lifting mechanism is provided below the outer roller table.

2. The production line according to claim 1, wherein a plurality of working boxes are provided on the collecting and distributing roller table for empty working box, and a total number of working boxes arranged is 1.5-2 times as large as a total number of 3D printing apparatuses arranged.

3. The production line according to claim 1, wherein both ends of the intermediate roller table are provided with the storage areas.

4. The production line according to claim 1, wherein a plurality of 3D printing apparatuses are provided between the intermediate transfer device and each transfer roller table for empty working box, and the plurality of 3D printing apparatuses are uniformly distributed in the transferring and conveying direction of the intermediate transfer device.

5. A cyclical printing method for the production line according to claim 1, comprising following steps: at beginning of printing, a starting position of the empty working box is located at the collecting and distributing roller table for empty working box; when an idle 3D printing apparatus being ready for printing on the production line, the empty working box is conveyed from the collecting and distributing roller table for empty working box to the intermediate transfer device via the first direction-changing device and then transferred to an outer roller table of a respective 3D printing apparatus; when the empty working box is conveyed to the inner roller table via the outer roller table and is aligned with a printing station above the inner lifting mechanism, 3D printing with a set program is started; after the completion of the printing, the working box is conveyed to the outer roller table again via the inner roller table, for scattered sand cleaning and residual powder removal in the working box; thereafter, the working box enters the intermediate transfer device, changes its direction by means of the second direction-changing device, passes through the intermediate roller table at one of the two sides and enters an idle baking device for baking; after the completion of baking, the working box is transferred to the storage area via the intermediate roller table, and printed models are collectively stored in the storage area; and in the storage area, after the printed models are taken out from the working box manually or by automation equipment, the working box is conveyed via the transfer roller table for empty working box and is returned, via the third direction-changing device, to the collecting and distributing roller table for empty working box to wait for next printing.

6. The production line according to claim 1, wherein a sand cleaning device is provided at a side of the outer lifting mechanism of the 3D printing apparatus.

7. The production line according to claim 1, wherein the powder supply device is connected with the upper layer frame and configured to supply powder to the powder spreading unit.

8. The production line according to claim 1, wherein the upper layer frame is configured to support the powder spreading movement system and the powder spreading unit.

9. The production line according to claim 1, wherein the lower layer frame is configured to fix the inner lifting mechanism, the inner roller table and the auxiliary unit.

10. The production line according to claim 1, wherein the auxiliary unit comprises a washing device and a cleaning device, wherein the washing device is configured to remove, in the printing process, impurities adhering to an inkjet head of the inkjet unit that adversely affect liquid ejection; and the cleaning device is configured to clean a sand scraper bottom plate of the powder spreading unit and sweep out impurities therefrom.

11. A production line using a plurality of 3D printing apparatuses comprising an intermediate transfer device, wherein both sides of the intermediate transfer device are provided with the plurality of 3D printing apparatuses, a sand cleaning device is provided at a side of an outer lifting mechanism of each of the plurality of 3D printing apparatuses, a transition roller table is provided at a junction between the intermediate transfer device and an outer roller table of each of the 3D printing apparatuses, two ends of the intermediate transfer device in a transferring and conveying direction thereof respectively extend beyond areas of the 3D printing apparatus, with the areas arranged in a same direction, one end of the intermediate transfer device is provided with a first direction-changing device, one side of the first direction-changing device is provided with a transient storage roller table for to-be-baked working box, the other side of the first direction-changing device is provided with a transfer roller table and a collecting and distributing roller table for empty working box that are arranged in parallel, the other end of the transfer roller table and the collecting and distributing roller table for empty working box is provided with a storage area, and the outer side of the first direction-changing device relative to the intermediate transfer device is provided with a baking device, wherein each of the plurality of 3D printing apparatuses comprises a frame assembly, and a powder spreading unit, a powder spreading movement system, a powder supply device, an inkjet unit, an inkjet movement system, a working box, a transfer unit, an inner lifting mechanism, the outer lifting mechanism, an accessory unit and an auxiliary unit that are mounted on the frame assembly, wherein the frame assembly comprises an upper layer frame and a lower layer frame, the powder spreading unit is connected with the lower layer frame by means of the powder spreading movement system and can move in a Y direction, the inkjet unit is connected with the upper layer frame by means of the inkjet movement system and can reciprocate in a X direction and the Y direction, the transfer unit comprises the outer roller table and an inner roller table that each comprise a driving mechanism and are configured to convey the working box, the inner roller table is provided in the lower layer frame below the powder spreading unit, the outer roller table is engaged with the inner roller table, the inner lifting mechanism is provided below the inner roller table, and the outer lifting mechanism is provided below the outer roller table.

12. The production line according to claim 11, wherein the plurality of 3D printing apparatuses are uniformly distributed in the transferring and conveying direction of the intermediate transfer device.

13. The production line according to claim 11, wherein a conveying direction of the transfer roller table, a conveying direction of the collecting and distributing roller table for empty working box and a conveying direction of the transient storage roller table for to-be-baked working box are parallel with each other, and a conveying direction of the intermediate transfer device is perpendicular to a conveying direction of the transient storage roller table for to-be-baked working box.

14. A cyclical printing method for the production line according to claim 11, wherein at beginning of printing, a starting position of a working box is located at the collecting and distributing roller table for empty working box, when an idle 3D printing apparatus being on the production line, the empty working box enters the outer roller table and the inner roller table of the idle 3D printing apparatus via the first direction-changing device and the intermediate transfer device, and then enters a printing area for 3D printing; after the completion of the printing, one of two routes is selected for the working box according to a difference of solidification requirement of materials in the working box, wherein in a first route, the working box is subjected to scattered sand removal at the outer lifting mechanism, then the working box enters the baking device for baking, via the intermediate transfer device and the first direction-changing device, the baked working box further enters the storage area via the first direction-changing device and the transfer roller table, printed models in the working box are taken out and stored in the storage area, and the empty working box returns to the collecting and distributing roller table for empty working box to wait for next cyclical printing; and in the second route, the working box enters the intermediate transfer device from the outer roller table of the 3D printing apparatus, passes through the first direction-changing device and then enters the baking device, and the baked working box further returns, via the first direction-changing device and the intermediate transfer device, to the outer lifting mechanism of the idle 3D printing apparatus on the production line for scattered sand removal, then passes through the intermediate transfer device, the first direction-changing device and the transfer roller table, and enters the storage area, the printed models in the working box are taken out and stored in the storage area, and the empty working box returns to the collecting and distributing roller table for empty working box to wait for next cyclical printing.

15. The production line according to claim 11, wherein a sand cleaning device is provided at a side of the outer lifting mechanism of the 3D printing apparatus.

16. The production line according to claim 11, wherein the powder supply device is connected with the upper layer frame and configured to supply powder to the powder spreading unit.

17. The production line according to claim 11, wherein the upper layer frame is configured to support the powder spreading movement system and the powder spreading unit.

18. The production line according to claim 11, wherein the lower layer frame is configured to fix the inner lifting mechanism, the inner roller table and the auxiliary unit.

19. The production line according to claim 11, wherein the auxiliary unit comprises a washing device and a cleaning device, wherein the washing device is configured to remove, in the printing process, impurities adhering to an inkjet head of the inkjet unit that adversely affect liquid ejection; and the cleaning device is configured to clean a sand scraper bottom plate of the powder spreading unit and sweep out impurities therefrom.

* * * * *